United States Patent [19]

Heaton et al.

[11] 4,197,771

[45] Apr. 15, 1980

[54] QUICK CHANGE DEVICE FOR MOUNTING TOOL IN SUPPORT MEMBER

[75] Inventors: James W. Heaton, Greensburg; Donald W. Warren, Latrobe; Albert B. Albrecht, Ligonier, all of Pa.

[73] Assignee: Kennametal Inc., Latrobe, Pa.

[21] Appl. No.: 808,968

[22] Filed: Jun. 22, 1977

Related U.S. Application Data

[60] Continuation of Ser. No. 756,790, Jan. 4, 1977, abandoned, which is a division of Ser. No. 528,159, Nov. 29, 1974, Pat. No. 4,018,112.

[51] Int. Cl.² .................. B23B 29/00; B26D 1/12; B23B 51/00
[52] U.S. Cl. ........................... 82/36 B; 82/36 A; 407/46; 407/101; 408/233
[58] Field of Search .............. 82/36 R, 36 A, 36 B, 82/24; 408/146, 154, 233, 238, 239 R, 239 A; 407/46, 101

[56] References Cited

U.S. PATENT DOCUMENTS

| | | | |
|---|---|---|---|
| 195,769 | 10/1877 | Neasham | 82/36 R |
| 3,120,961 | 2/1964 | Clarkson | 408/238 |
| 3,178,969 | 4/1965 | Yogus et al. | 408/154 |
| 3,238,600 | 3/1966 | Milewski | 408/233 |
| 3,498,653 | 3/1970 | McCreery | 82/36 B |
| 3,604,293 | 9/1971 | Foll et al. | 82/24 |
| 3,750,498 | 8/1973 | Willen | 82/36 R |
| 3,822,620 | 7/1974 | Heaton et al. | 82/36 A |
| 4,024,778 | 5/1977 | De Fauw | 82/36 R |

*Primary Examiner*—Harrison L. Hinson
*Attorney, Agent, or Firm*—Lawrence R. Burns

[57] ABSTRACT

A quick change device for mounting a tool in a support member such as a turret. The tool has a shank with radially outwardly movable balls therein and the mounting device includes a sleeve receivable on the shank and adapted for mounting in a bore in the support member. The shank includes an actuator ball causing the aforementioned balls to move radially outwardly and engage a shoulder at the end of the sleeve to pull the tool into a predetermined axial position and lock the tool in the aforementioned position while cooperating elements of key means in the tool in the support member prevent rotation of the tool in the support member.

8 Claims, 1 Drawing Figure

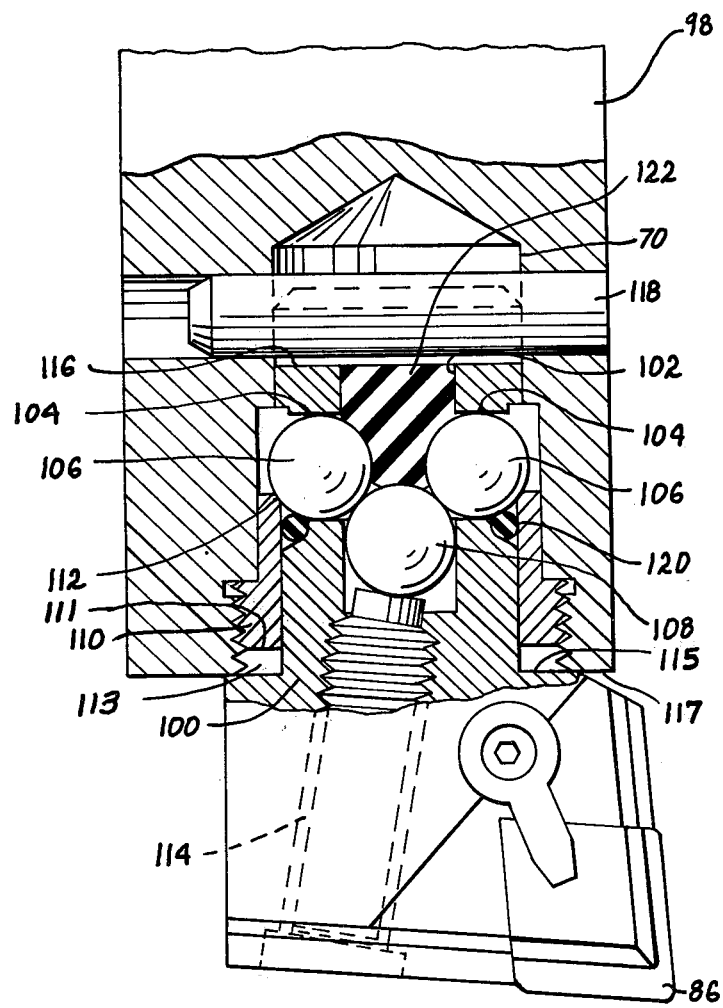

QUICK CHANGE DEVICE FOR MOUNTING TOOL IN SUPPORT MEMBER

The present invention relates to quick change devices for connecting tools to support members, and is a Continuation of copending application Ser. No. 756,790, filed Jan. 4, 1977, and entitled "QUICK CHANGE DEVICE FOR MOUNTING IN SUPPORT MEMBER," now abandoned which was a Division of application Ser. No. 528,159, filed Nov. 29, 1974, and entitled "MACHINE TOOL HAVING A SPECIAL INDEXABLE TURRET AND METHOD OF OPERATION," now U.S. Pat. No. 4,018,112.

In the maintaining of a machine tool in a state of high productivity, it is important to be able to change the cutting tools therein as quickly as possible while, also, precisely locating the cutting tools in the proper position.

In the application parent to the present one, there is shown a turret having a plurality of tools mounted therein, and there is illustrated a number of arrangements for detachably supporting the tools in bores provided therefor in the respective turret.

The present application is concerned with a particular type of quick change device for mounting a tool in a respective bore in a support member such as a turret.

The primary object of the present invention is the provision of a quick change device for connecting tools to support members which is relatively inexpensive to construct, which is accurate in respect of locating the tool and which is extremely quick operating.

BRIEF SUMMARY OF THE INVENTION

According to the present invention, a tool is provided for mounting in a bore in a support member in which the tool has a head at the outer end notched or provided with a pocket for receiving a cutting insert while, on the rearward side of the head, the tool comprises a cylindrical shank, A sleeve or ring fits closely but slidably on the shank and has threads at the head end which are receivable in a counterbored outer end portion of the aforementioned bore in the support member.

The shank has radially movable clamp balls mounted therein and an actuator ball mounted in an axial bore formed in the shank and an actuator screw for moving the actuator ball longitudinally in the bore in the shank. When the actuator ball moves in one direction, the clamp balls carried in the shank will move radially outwardly and will engage the end of the steel ring, and when the actuator ball is moved in the other direction, the clamp balls can be retracted inwardly within the envelope of the shank, and the tool removed from the sleeve, and, therefore, from the support member.

The actuating screw is readily accessible from the outer end of the tool, and the operation of removing a tool from the support member and placing another therein can be carried out quite quickly. The tool has an abutment region at the rearward side of the head that abuts the outer end of the support member when the clamp balls are pushed radially outwardly so that the tool is located radially axially in the bore in the support member. The support member and the tool include cooperating elements of a keying device that nonrotatably connects the tool to the support member when it is mounted therein.

The exact nature of the present invention will become more clearly apparent upon reference to the following detailed specification taken in connection with the accompanying drawing which shows a quick change device according to the present invention.

DETAILED DESCRIPTION OF THE INVENTION

Referring to the drawing, there is shown therein a support member 98 which may be a tool holder portion of a machine tool of any type, such as a turret or a support member for receiving a single tool. The support member 98 has a bore 70 therein for receiving a tool.

The tool itself comprises an outer head portion formed with a notch or pocket for receiving a cutting insert 86 and having a shank portion receivable in bore 70.

The shank 100 of the tool is provided with a central axial bore 102 while radial bores 104, which may be three in number, intersect the axial bore. Ball elements 106 are mounted in the radial bores and a further ball element 108 is mounted in the axial bore. The bore 70 in the support member is counterbored and threaded at the outer end and mounted therein for a steel ring 110 which, at the inner end, has a bevelled end surface 112 for engagement by balls 106.

Ring 110 preferably has a shoulder which abuts the bottom of the threaded counterbore, as shown, to locate ring 110 axially in the turret or support member. The head portion of the tool, which is notched to receive a cutting insert 86, has a shoulder to engage the end face of the turret or support member to locate the tool axially in bore 70.

A screw 114 has an inner end engaging ball 108 and is accessible from the outer end of the tool. When the shank of the tool is placed in bore 70, a lateral slot 116 at the inner end embraces the fixed pin 118 in the bore thereby angularly to locate the tool and, upon rotation of screw 114, ball 108 will move axially inwardly toward pin 118 and will cause balls 106 to move outwardly and engage the inner end of sleeve 110 and thereby draw the tool backwardly toward the support member into a fixed axial location therein.

A rubber-like O-ring 120 can be provided to retain balls 106 in the respective bores therefor and the rearward end of axial bore 102 may be provided with a rubber-like filler plug 122.

Modifications may be made within the scope of the appended claims.

What is claimed is:

1. In combination; a support member and a quick change mounting device for mounting a tool in a work station in said support member and comprising means forming a threaded bore in said support member, a sleeve threaded into said bore and having an inner end presenting a shoulder, means for locating said sleeve in a predetermined axial position in said bore, said tool having a shank having a close sliding fit in said sleeve and receivable in said sleeve from the outer end thereof and protruding inwardly beyond the said shoulder, means for locating said shank in a predetermined axial position in said respective bore, coplanar perforations formed in said shank having axes positioned inwardly from said shoulder when the shank is in said predetermined axial position in said bore, clamp balls in said perforations which engage the shoulder when moved radially outwardly in the respective perforations, a central hole formed in said shank intersecting said perforations, an actuating ball in said hole, means for moving said actuating ball axially in said hole to drive said clamp balls radially outwardly in said perforations into engagement with said shoulder, and means keying said tool against rotation on the axis of said shank in said support member.

2. The combination according to claim 1 in which the bore in the support member is counterbored from the outer end and said sleeve has a second shoulder facing the bottom of said counterbore and engageable therewith when the sleeve is threaded into said bore to locate said sleeve in said prededetermined axial position in the bore.

3. The combination according to claim 1 in which said means for locating said tool axially in the respective bore in the support member comprises cooperating elements of abutment means on the tool and the support member which interengage when the tool shank is inserted into said sleeve from said outer end thereof.

4. The combination according to claim 1 in which said shoulder tapers outwardly toward said inner end of said sleeve.

5. In a support member for receiving a quick detachable tool; at least one planar face formed on said support member and a bore formed in the support member perpendicularly to and through said planar face for receiving a shank on a tool, an axially outer greater diameter portion which is internally threaded to receive a threaded portion on a sleeve closely fitting in said bore and surrounding a tool shank, an axially inner smaller diameter portion and an intermediate diameter portion between said axially outer and axially inner bore portions, said bore including an outwardly facing shoulder located a predetermined distance inwardly from said planar face for engaging a shoulder formed on a sleeve to locate a sleeve axially in said bore, said axially outer bore portion adapted to receive a threaded outer end portion of the sleeve while said intermediate diameter portion adapted closely to embrace the sleeve axially inwardly from the threaded outer end portion of the sleeve, and said axially inner bore portion adapted closely to embrace the shank of the tool mounted in the bore.

6. A sleeve element according to claim 5 which includes a sleeve element in said bore, said sleeve comprising a wear and deformation resistant metal having an externally threaded larger diameter axially outer portion threaded into the axially outer portion of said bore and an axially inner smaller diameter portion fitted in said intermediate diameter portion of said bore and an axially inwardly facing annular shoulder at the juncture of said axially outer and axially inner portions engaging the shoulder in said bore.

7. In combination for use with a support member having a threaded bore; a quick change mounting device for mounting a tool in the bore in the support member and comprising; a sleeve threaded into and having a predetermined axial portion in the said bore and having an inner end presenting a shoulder, said tool having a shank having a close sliding fit in said sleeve and receivable in said sleeve from the outer end thereof and protruding inwardly beyond the said shoulder, said shank having an abutment element engageable with the support member to locate the tool in a predetermined axial position in the bore, coplanar perforations formed in said shank having axes positioned inwardly from said shoulder when the shank is in said predetermined axial position in said bore, clamp balls in said perforations which engage the shoulder when moved radially outwardly in the respective perforations, a central hole formed in said shank intersecting said perforations, an actuating ball in said hole, means for moving said actuating ball axially in said hole to drive said clamp balls radially outwardly in said perforations into engagement with said shoulder, said tool including an element of key means for use in holding the tool against rotation on the axis of said shank in the bore in the support member.

8. The combination according to claim 7 in which the bore in the support member has an axially outwardly facing annular abutment area therein and said sleeve has an axially inwardly facing annular abutment area thereon, said areas being interengageable when the sleeve is threaded into the bore to locate said sleeve in said predetermined axial position in the bore.

* * * * *